United States Patent
Reddy et al.

(10) Patent No.: US 12,159,048 B2
(45) Date of Patent: Dec. 3, 2024

(54) METHOD AND APPARATUS FOR SHARING STORAGE PARTITIONS

(71) Applicant: Dell Products L.P., Round Rock, TX (US)

(72) Inventors: A Ashok Kumar Reddy, Bangalore (IN); Sridharan Kuppuswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 18/296,475

(22) Filed: Apr. 6, 2023

(65) Prior Publication Data

US 2024/0338140 A1 Oct. 10, 2024

(51) Int. Cl.
*G06F 3/06* (2006.01)

(52) U.S. Cl.
CPC ............ *G06F 3/0644* (2013.01); *G06F 3/064* (2013.01); *G06F 3/0664* (2013.01); *G06F 3/0685* (2013.01); *G06F 3/0607* (2013.01)

(58) Field of Classification Search
None
See application file for complete search history.

(56) References Cited

FOREIGN PATENT DOCUMENTS

| CN | 104392189 A | * | 3/2015 | .............. G06F 21/10 |
| CN | 108763099 A | * | 11/2018 | ......... G06F 12/0246 |
| CN | 114756296 A | * | 7/2022 | |

* cited by examiner

*Primary Examiner* — Brian R Peugh
(74) *Attorney, Agent, or Firm* — Daly, Crowley, Mofford & Durkee, LLP (57) ABSTRACT

A method, comprising: receiving, by an agent that is executing in a first guest operating system, a request to mount a storage partition; detecting, by the agent, whether the storage partition is identified in a read-only list; when the storage partition is identified in the read-only list, setting the storage partition as read-only at a block level, and mounting the storage partition in the first guest operating system as a read-only volume; and when the storage partition is not identified in the read-only list, mounting the storage partition in the first guest operating system as a read-write volume and updating the read-only list to include an identifier of the storage partition.

20 Claims, 7 Drawing Sheets

METHOD AND APPARATUS FOR SHARING STORAGE PARTITIONS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving, by an agent that is executing in a first guest operating system, a request to mount a storage partition; detecting, by the agent, whether the storage partition is identified in a read-only list; when the storage partition is identified in the read-only list, setting the storage partition as read-only at a block level, and mounting the storage partition in the first guest operating system as a read-only volume; and when the storage partition is not identified in the read-only list, mounting the storage partition in the first guest operating system as a read-write volume and updating the read-only list to include an identifier of the storage partition.

According to aspects of the disclosure, a system is provided, comprising: a memory; and at least one processor that is operatively coupled to the memory, the at least one processor being configured to perform the operations of: receiving, by an agent that is executing in a first guest operating system, a request to mount a storage partition; detecting, by the agent, whether the storage partition is identified in a read-only list; when the storage partition is identified in the read-only list, setting the storage partition as read-only at a block level, and mounting the storage partition in the first guest operating system as a read-only volume; and when the storage partition is not identified in the read-only list, mounting the storage partition in the first guest operating system as a read-write volume and updating the read-only list to include an identifier of the storage partition.

According to aspects of the disclosure, a non-transitory computer-readable medium is provided that stores one or more processor-executable instructions, which, when executed by at least one processor cause the at least one processor to perform the operations of: receiving, by an agent that is executing in a first guest operating system, a request to mount a storage partition; detecting, by the agent, whether the storage partition is identified in a read-only list; when the storage partition is identified in the read-only list, setting the storage partition as read-only at a block level, and mounting the storage partition in the first guest operating system as a read-only volume; and when the storage partition is not identified in the read-only list, mounting the storage partition in the first guest operating system as a read-write volume and updating the read-only list to include an identifier of the storage partition

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
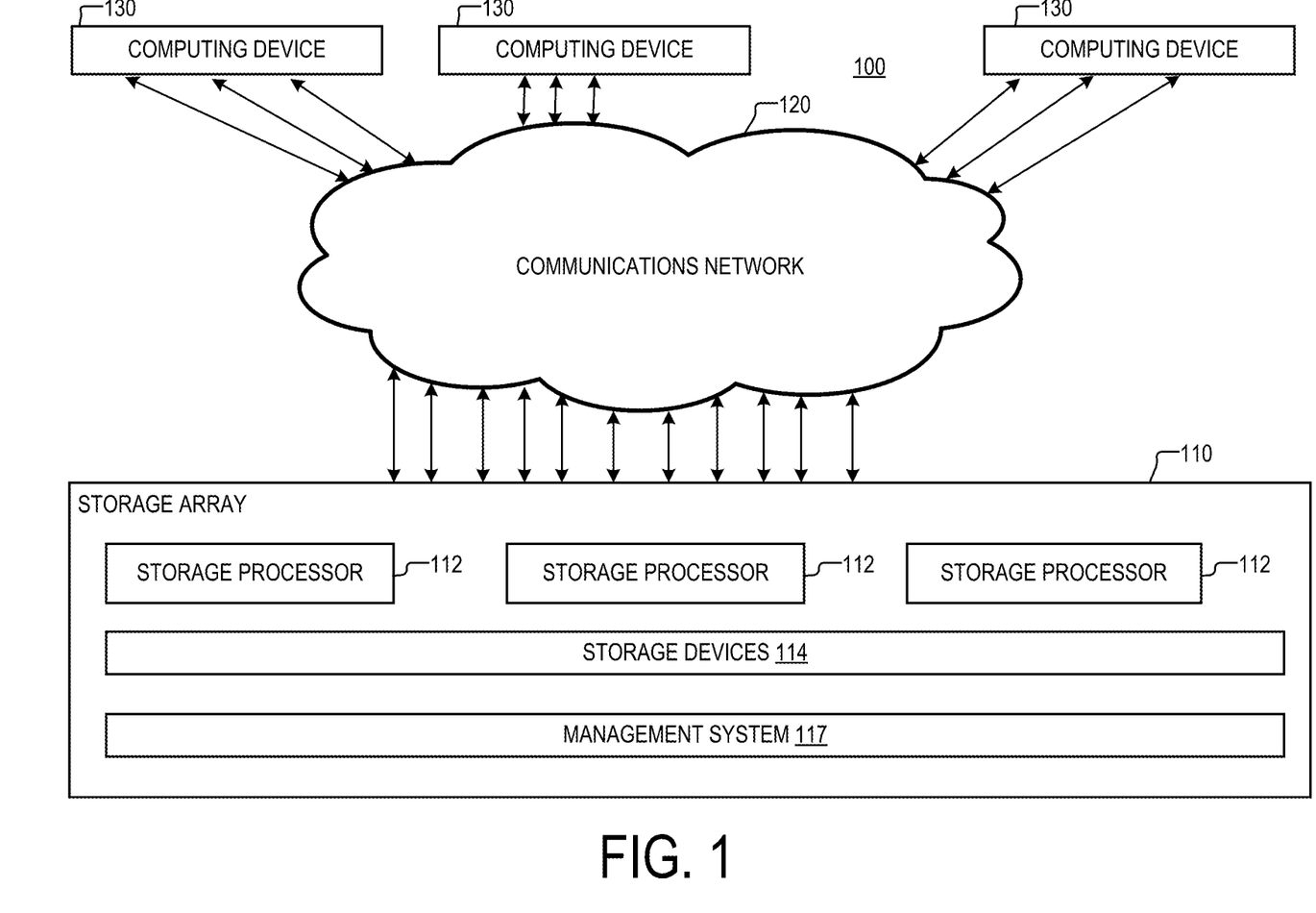
FIG. 1 is a diagram of an example of a system, according to aspects of the disclosure.
Figure 2:
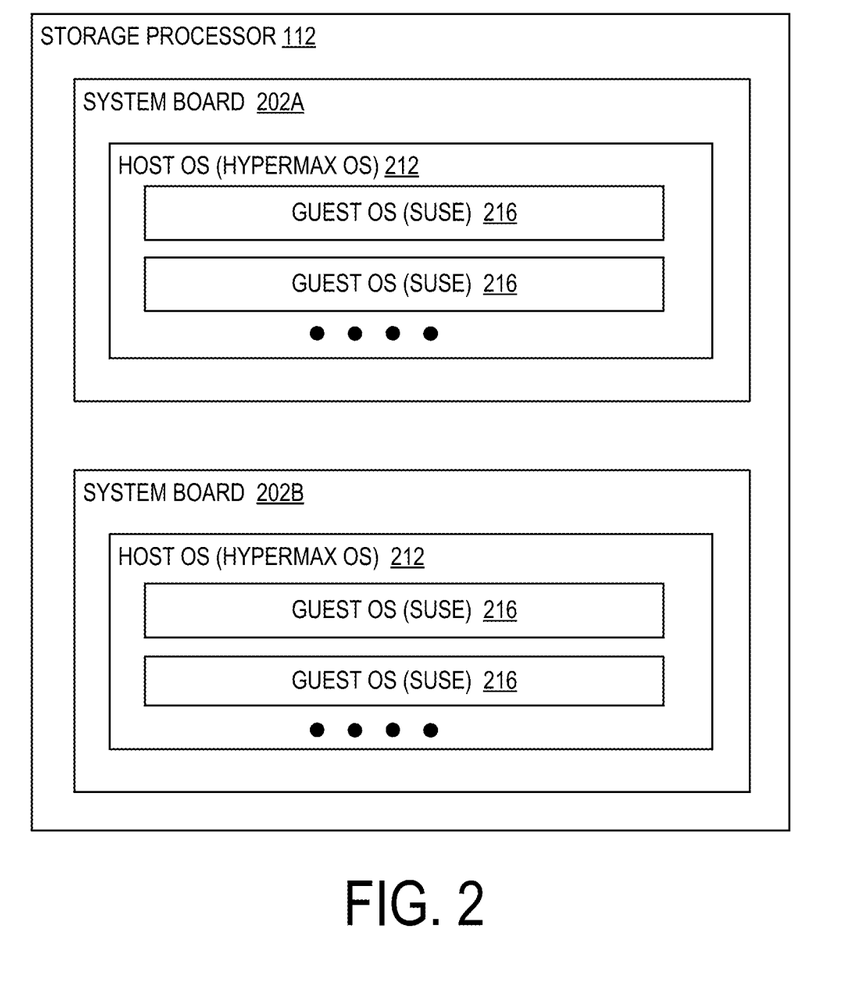
FIG. 2 is a diagram of an example of a storage processor, according to aspects of the disclosure.

FIG. 1 is a diagram of an example of a system 100, according to aspects of the disclosure. As illustrated, the system 100 may include a storage array 110, a communications network 120, and a plurality of computing devices 130. The communications network 120 may include one or more of a fibre channel (FC) network, the Internet, a local area network (LAN), a wide area network (WAN), and/or any other suitable type of network. The storage array 110 may include a storage system, such as DELL/EMC Powermax™, DELL PowerStore™, and/or any other suitable type of storage system. The storage array 110 may include a plurality of storage processors 112, a plurality of storage devices 114, and a management system 117. Each of the storage processors 112 may include a computing device, such as the computing device 800, which is discussed further below with respect to FIG. 8. Each of the storage processors 112 may be configured to receive I/O requests from computing devices 130 and execute the received I/O requests by reading and/or writing data to storage devices 114. Each of the storage devices 114 may include one or more of a solid-state drive (SSD), a hard disk (HD), a non-volatile random-access memory (NVRam) device, a non-volatile memory express (NVMe) device, and/or any other suitable type of storage device. The management system 117 may include a computing device, such as the computing device 800, which is discussed further below with respect to FIG. 8. The management system 117 may be used by a system administrator to modify various configuration settings and/or otherwise manage storage array 110. Each computing device 130 may include a laptop computer, a desktop computer, an Internet-of-things (IoT) device, and/or any other suitable type of computing device that might read or write data to the storage array 110. The storage processors 112 may be connected to the management system via one or more of a fibre channel (FC) network, the Internet, a local area network (LAN), a wide area network (WAN), and/or any other suitable type of network FIG. 2 is a diagram of a storage processor 112, according to one possible implementation. In some implementations, each of the storage processors 112 in the storage array 110 may have the configuration that is shown in FIG. 2. As illustrated, the configuration of a storage processor 112, which is shown in FIG. 2 may include system boards 202A and 202B. Each of system boards 202A and 202B may include a motherboard, a processor (e.g., an x86 processor or a MIPS processor, etc.), a memory (e.g., Double Data Random Access Memory (DDRAM), etc.), and/or any other suitable type of component. Each of the system boards 202A and 202B may be configured to execute a respective host operating system (OS). Inside of each respective host operating system 212, one or more container threads (not shown) may be executed. Each container thread may spawn a different respective guest operating system instance (i.e., one of the guest operating systems 216) and be responsible for providing virtualized resources to the guest operating system. Each of the container threads may provide various system libraries, binaries, and configuration files that are necessary for the execution of the container thread's respective guest operating system instance. In the present example, each of the guest operating systems 216 is a SUSE Linux™ operating system, however, the present disclosure is not limited to using any specific type of operating system being used.

Figure 3:
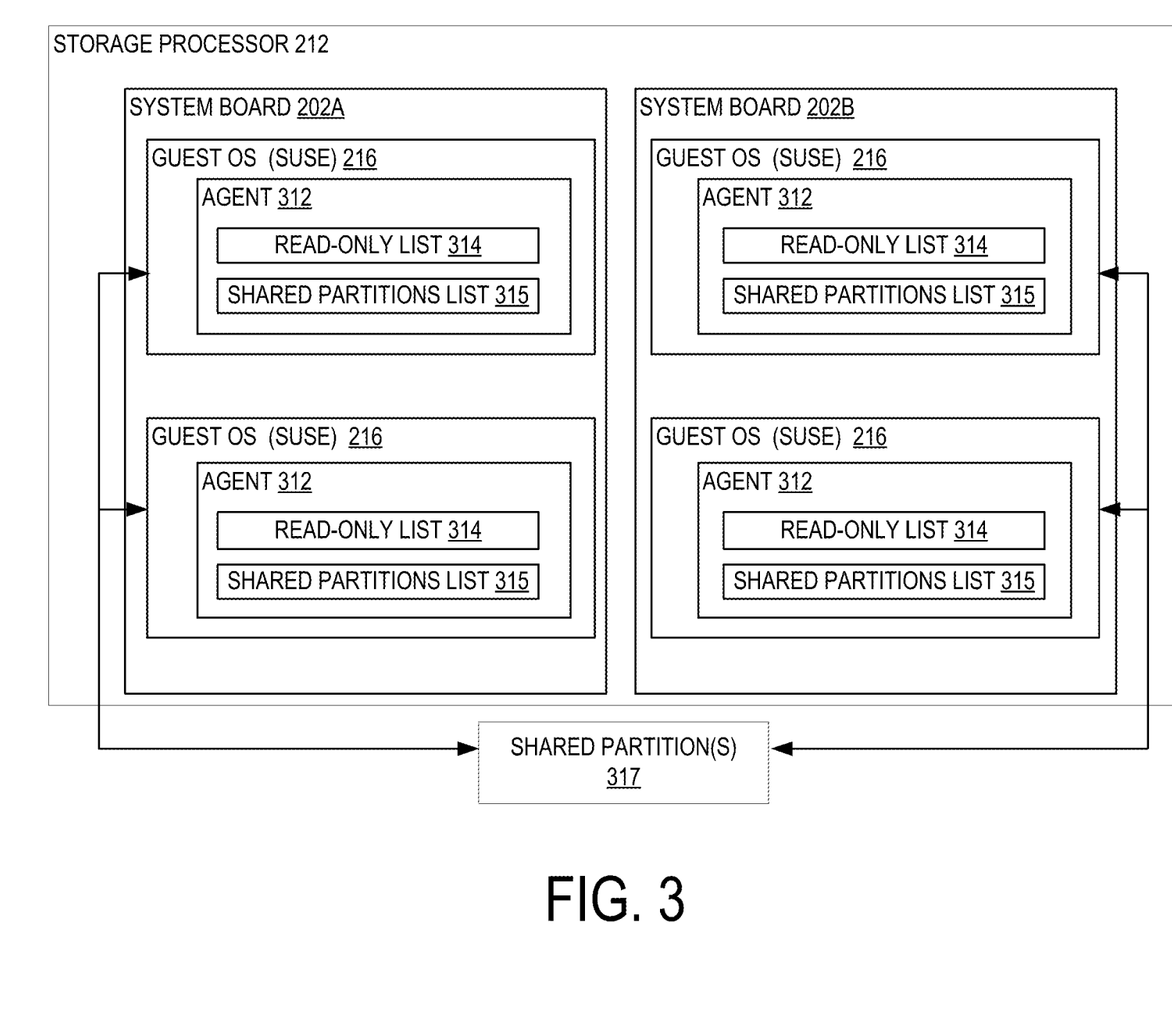
FIG. 3 is a diagram of an example of a storage processor, according to aspects of the disclosure.

Each respective guest operating system 216 may execute various applications therewithin. By way of example, the applications that are executed on any of the guest operating systems 216 may be configured to perform management or integration functions. However, it will be understood that the present disclosure is not limited to the applications performing any specific function. In some implementations, two (or more) guest operating systems 216 may execute different instances of the same application. The application instance in one of the guest operating systems 216 may be executed in active mode and the application instance in another guest operating system may be executed in standby mode, ready to take over in case the former application instance fails. For a successful failover to be executed between the two application instances, the states of the two application instances need to be synchronized. The states of the two application instances may be synchronized by having the two application instances share the same storage partition. For example, the application instances may share one of the storage partitions 317, which are shown in FIG. 3. Processes 400-700, which are discussed further below with respect to FIGS. 4-7, provide examples of methods for sharing the same storage partition between different guest operating systems 216 (and/or different application instances that are executed within the guest operating systems 216) in a way that does not result in file system errors and/or data corruption. Processes 400-700 may be used to share the same partition between guest operating systems that are executed on the same storage processor 112 or on different storage processors 112.

FIG. 3 is a diagram of an example of the software environment of a storage processor 112, according to aspects of the disclosure. In the example of FIG. 3, each of the guest operating systems 216 may be configured to access one or more shared storage partitions 317. The shared storage partitions 317 may be implemented on storage devices 114 (shown in FIG. 1). The shared storage partitions 317 may be used internally by the guest operating systems 216 or by applications that are executed in the guest operating systems 216.

Each of the guest operating systems 216 may be configured to execute a respective agent 312. Each respective agent 312 may be configured to receive an instruction to mount one of the storage partitions 317 and execute the instruction. In some implementations, each respective agent 312 may be configured to execute one or more of processes 400-700, which are discussed further below with respect to FIGS. 4-7. Each respective agent 312 may be implemented in hardware, in software, or as a combination of hardware and software. In a preferred implementation, the respective agent 312 in each of the guest operating systems 216 may be implemented as one or more processes or threads that are executed within the guest operating system 216.

Each of the guest operating systems 216 may be provided with a list 315. The list 315 may include identifiers of storage partitions 317 that are intended to be shared. In some implementations, the list 315 may be used to determine if a storage partition 317 is intended to be shared by multiple guest operating systems 216. For example, if list 315 includes an identifier of the storage partition 317, a determination may be made that the storage partition is intended to be shared. Otherwise, if list 315 does not include an identifier of the storage partition 317, a determination may be made that the partition 317 is not intended to be shared. The list 315 may be populated with identifiers of shared storage partitions by a system administrator and/or in any other suitable manner.

According to the present example, each of the guest operating systems 216 is provided with a different respective copy of the list 315. The respective state of each copy of the read-only list is synchronized with the states of the remaining copies of list 315. However, alternative implementations are possible in which a different respective copy of the list 315 is maintained by each host operating system 212 or by the management system 117. Stated succinctly, the present disclosure is not limited to storing the list 315 at any specific location.

Each of the guest operating systems 216 may be provided with a read-only list 314. The read-only list 314 may include one or more identifiers that belong to the shared storage partitions 317. Each of the partitions that are listed in the read-only list 314 is required to be mounted as a read-only volume, and it is not permitted to be mounted as a read-write volume. On the other hand, if a partition 317 is not identified in the read-only list 314, that partition is permitted to be mounted as a read-write volume. The read-only list 314 may be used by the agents 312 to enforce a policy that governs the mounting of a storage partition 317 in more than one of the guest operating systems 216. The policy provides that, at any given time, a storage partition 317 cannot be mounted in read-write mode on more than one guest operating system 216 (on any of the storage processors 112). Specifically, the read-only list 314 may be used to ensure that each of the shared storage partitions 317 can be mounted as a read-write volume on only one guest operating system 216, while permitting the same storage partition 317 to be mounted as a read-only volume on other ones of the guest operating systems 216.

According to the present example, the read-only list 314 is implemented as a text file. However, alternative implementations are possible in which the read-only list 314 is implemented by using one or more other data structures. Stated succinctly, the present disclosure is not limited to any specific implementation of the read-only list 314. The term "read-only" as used throughout the disclosure in the phrase "read-only list" is intended to indicate that the list identifies storage partitions that are required to be mounted in read-only mode, and it does not imply any specific access permissions for the list 314.

According to the present example, each of the guest operating systems 216 is provided with a different respective copy of the read-only list 314. The respective state of each copy of the read-only list is synchronized with the states of the remaining copies of the read-only list 314, such that when a partition identifier is deleted from one copy of the read-only list 314, the deletion is propagated to the remaining copies of the read-only list 314. Alternatively, when a new partition identifier is added to one copy of the read-only list 314, the new partition identifier is subsequently added to all remaining copies of the read-only list 314. Although, in the present example, a different respective copy of the read-only list 314 is provided in each guest operating system 216, alternative implementations are possible in which a different respective copy of the read-only list 314 is maintained by each host operating system 212 and used jointly by the guest operating system instances 216 that are executed within that host operating system 212. Alternatively, a copy of the read-only list 314 may be stored in the management system 117, and accessed remotely by all guest operating systems 216 in the storage array 110. Stated succinctly, the present disclosure is not limited to storing the read-only list 314 at any specific location.

In some implementations, each agent 312 may be configured to add a storage partition to the read-only list 314, as specified by steps 408, 512, and 616 of processes 400-600. (Sec FIGS. 4-6.) Adding a storage partition to the read-only list may include adding an identifier corresponding to the storage partition to the read-only list 314. When the read-only list 314 is stored in the memory space of the guest operating system 216 where the agent 312 is executed, the identifier may be added by writing it directly to the read-only list 314. Alternatively, in implementations in which the read-only list 314 is stored in the memory of the management system 117, the agent 312 may add the identifier of the storage partition to the read-only list 314 by transmitting to the management system 117 an instruction to add the identifier to the list 314. In some implementations, the instruction may include an opcode and the identifier of the storage partition. Alternatively, in implementations in which the read-only list 314 is stored in the memory of the storage processor 112 that is executing the agent 312, at a memory location that is inaccessible by the agent 312 (or inaccessible from within the guest operating system 216 executing the agent 312), the agent 312 may add the identifier of the storage partition to the read-only list 314 by calling an application programming interface (API) that is provided by the container thread associated with the guest operating system 216 inside which the agent 312 is executed. Throughout the disclosure, the phrases "updating a read-only list to reference a storage partition" and "adding an identifier of the storage partition to the read only list" are used interchangeably.

In some implementations, each agent 312 may be configured to remove a storage partition from the read-only list 314, as specified by step 708 of process 700. (See FIG. 7.) Removing a storage partition from the read-only list 314 may include deleting from the read-only list 314 an identifier that corresponds to the storage partition 317. When the read-only list 314 is stored in the memory space of the guest operating system 216 where the agent 312 is executed, the identifier may be deleted directly by the agent 312. Alternatively, in implementations in which the read-only list 314 is stored in the memory of the management system 117, the agent 312 may delete the identifier by transmitting to the management system 117 an instruction to delete the identifier from the read-only list 314. In some implementations, the instruction may include an opcode and the identifier of the storage partition. Alternatively, in implementations in which the read-only list 314 is stored in the memory of the storage processor 112 that is executing the agent 312, at a memory location that is inaccessible by the agent 312 (or inaccessible from within the guest operating system 216 executing the agent 312), the agent 312 may delete the identifier of the storage partition to the read-only list by calling an API that is provided by the container thread associated with the guest operating system 216 inside which the agent 312 is executed.

In some implementations, each agent 312 may be configured to determine whether a storage partition is identified in the read-only list 314, as specified by steps 504 and 606 of processes 500-600. (See FIGS. 5-6.) When the read-only list 314 is stored in the memory space of the guest operating system 216 where the agent 312 is executed, the agent may directly perform a search of the read-only list 314 to determine if an identifier of the storage partition is contained in the read-only list 314. Alternatively, in implementations in which the read-only list 314 is stored in the memory of the management system 117, the agent 312 may transmit to the management system 117 an instruction to verify whether the identifier of the storage partition is part of the read-only list 314. In some implementations, the instruction may include an opcode and the identifier of the storage partition. In response to the instruction, the agent 312 may receive from the management system 117 an indication of whether the identifier of the storage partition is part of the read-only list 314. Alternatively, in implementations in which the read-only list 314 is stored in the memory of the storage processor 112 that is executing the agent 312, at a memory location that is inaccessible by the agent 312 (or inaccessible from within the guest operating system 216 executing the agent 312), the agent 312 may call an API that is provided by the container thread associated with the guest operating system 216 inside which the agent 312 is executed. The API call may return an indication of whether the identifier of the storage partition is part of the read-only list 314.

In some implementations, each agent 312 may be configured to determine whether a storage partition is listed in the list 315, as specified by step 602 of process 600. (E.g., see FIG. 6.) As noted above, the verification may be the performed to determine whether the storage partition is a shared storage partition. The term "shared storage partition" as used throughout the disclosure means "a storage partition that is intended to be shared" and it does not necessarily imply that the storage partition is currently shared (i.e., mounted in more than one guest operating system 216). When the read-only list 314 is stored in the memory space of the guest operating system 216 where the agent 312 is executed, the agent 312 may directly search the list 315 to determine if the identifier of the storage partition is part of the list. Alternatively, in implementations in which the read-only list 314 is stored in the memory of the management system 117, the agent 312 may transmit to the management system 117 an instruction to verify whether the identifier of the storage partition is part of the list 315. In some implementations, the instruction may include an opcode and the identifier of the storage partition. In response to the instruction, the agent 312 may receive from the management system 117 an indication of whether the identifier of the storage partition is part of the list 315. Alternatively, in implementations in which the list 315 is stored in the memory of the storage processor 112 that is executing the agent 312, at a memory location that is inaccessible by the agent 312 (or inaccessible from within the guest operating system 216 executing the agent 312), the agent 312 may call an API that is provided by the container thread associated with the guest operating system 216 inside which the agent 312 is executed. The API call may return an indication of whether the identifier of the storage partition is part of the list 315.

According to the present example, each of the storage partitions 317 is formatted by using a disk file system, such as BTRFS or EXT4. Disk file systems are usually block-oriented and permit random-access read, write, and modify. Disk file systems are to be contrasted with shared disk file systems, such as OCF and NFS. Shared disk file systems are optimized for use on computer clusters and usually provide network file-sharing protocols, such as NFS, SMB, or AFP (whereas disk file systems do not provide network file sharing-protocols). Moreover, a shared disk file system may provide a file server, which removes the responsibility of file serving from other servers that are available in an operating system.

Although disk file systems can be shared among multiple devices, it has been determined that the sharing of a disk file system among multiple guest operating systems can lead to errors and data corruption in the long run. The errors may be created because (unlike shared file systems) disk file systems lack a coordinator layer (e.g., a file server) that sequences the writes to those systems.

On the other hand, the provision of a file server in a shared disk file system, adds overhead to the use of the file system, and a potential bottleneck. Put simply, a shared file system may have a slower response than a disk file system, in the architecture shown in FIGS. 1-3. In this regard, in some use cases, it is desirable for the guest operating systems 216 to share partitions that are formatted with a disk operating system, rather than a shared disk operating system. Accordingly, the need exists for a method for sharing disk file systems that, unlike conventional methods for sharing disk file systems, is not susceptible to errors.

The present disclosure addresses this need. Processes 400-700, which are discussed further below, enable the sharing of a disk file systems in a way that does not result in errors. Although processes 400-700 are presented in the context of sharing disk file systems, it will be understood that they can be used to share other types of file systems. Stated succinctly, the methods and ideas presented throughout the disclosure are not limited to the sharing of disk file systems only.

Figure 4:
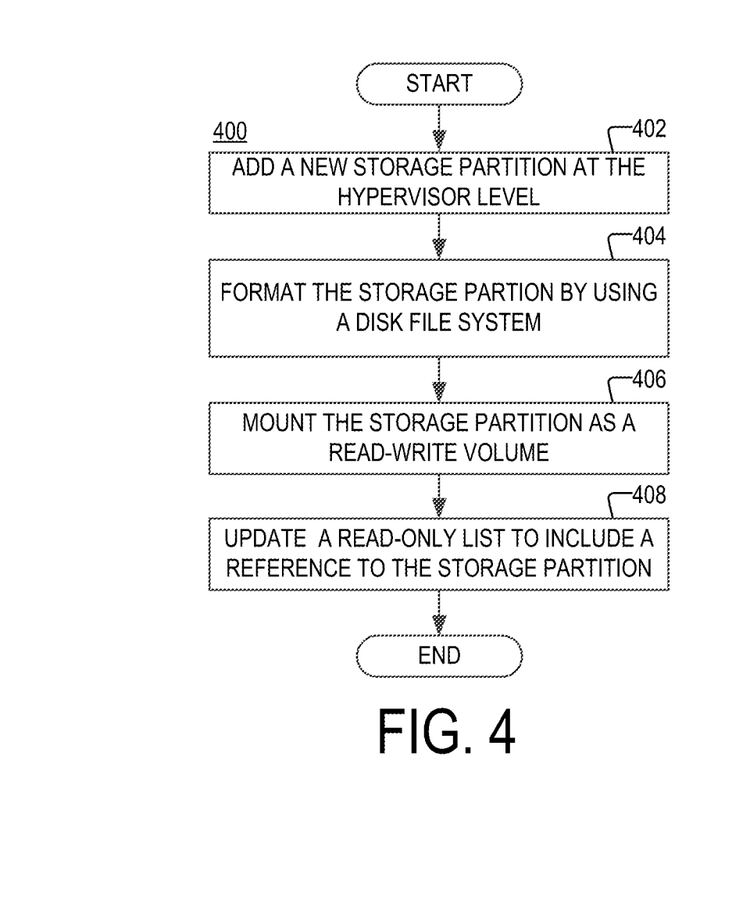
FIG. 4 is a flowchart of an example of a process, according to aspects of the disclosure.

FIG. 4 is a diagram of an example of a process 400, according to aspects of the disclosure. According to the present example, all of the steps in the process 400 are performed by one of the instances of the agent 312 (shown in FIG. 3), which is herein referred to as "the given agent 312". The guest operating system 216 where the given agent 312 is executed is herein referred to as "given guest operating system 216". At step 402, the given agent 312 adds one of the storage partitions 317 at the hypervisor level. Adding the storage partition at the hypervisor level may include creating a device file for the storage partition in the host operating system instance 212 that is hosting the given guest operating system 216. At step 404, the given agent 312 formats the given storage partition (added at step 404) by using a disk file system. The disk file system may include any suitable type of file system, such as EXT4 or BRTFS. However, the present disclosure is not limited to using any specific file system. At step 406, the given agent 312 mounts the storage partition as a read-write volume. The storage partition is mounted in the guest operating system 216 where the given agent 312 is executed. At step 408, the read-only list 314 is updated to include a reference to the storage partition. Step 408 may be performed by using any of the methods discussed above with respect to FIG. 3.

Figure 5:
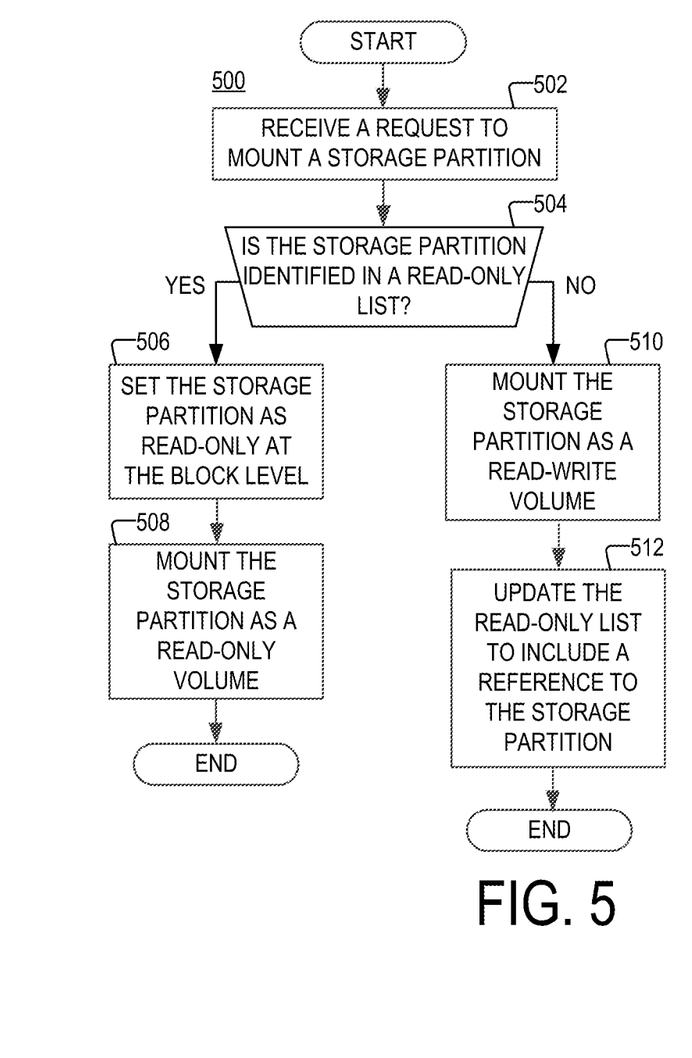
FIG. 5 is a flowchart of an example of a process, according to aspects of the disclosure.

FIG. 5 is a flowchart of an example, of a process 500 according to aspects of the disclosure. According to the present example, all of the steps in the process 500 are performed by one of the instances of the agent 312 (shown in FIG. 3), which is herein referred to as "the given agent 312". The guest operating system 216 where the given agent 312 is executed is herein referred to as "given guest operating system 216".

At step 502, the given agent 312 receives a request to mount a storage partition. The storage partition may be one of the storage partitions 317, which are discussed above with respect to FIG. 3. In some implementations, the request may be received from the management system 117 (shown in FIG. 1)

At step 504, the given agent 312 determines if the storage partition is identified in the read-only list 314. Step 504 may be performed by using any of the methods discussed above wtih respect to FIG. 3. If the storage partition is identified in the read-only list, the process 500 proceeds to step 506. Otherwise, the process 500 proceeds to step 510.

At step 506, the given agent 312 sets the storage partition as read-only at the block level. In instances in which the given guest operating system 216 is Linux, the storage partition may be set as read-only at the block level by executing the command of "/sbin/blockdev-v-setro/dev/nvme0n21", where "nvme0n21" is the identifier of the storage partition. Setting the storage partition as read-only may provide additional protection against applications in the given guest operating system 216 writing to the storage partition. The "setro" parameter sets the partition as read-only at the block level, without disturbing currently-active access to the partition. For example, a prior mount of the partition that is performed in read-write mode would not be affected by the application of the "setro" parameter.

At step 508, the storage partition is mounted as a read-only volume in the given guest operating system 216. In instances in which the given guest operating system 216 is Linux, the storage partition may be mounted by executing the command of "/usr/bin/mount-t btrfs-0 ro,noatime,noiversion,lazytime,norecovery/dev/nvme0n21/readon-ly_mnt," where "/dev/nvme0n21" is the device file for the storage partition and "/readonly_mnt" is the mount point for the storage partition. According to the present example, parameter "noatime" prevents the update of inode access times on the file system for the partition. This parameter works for all inode types (directories too), so it implies nodiratime—i.e., it disables updating of atime for directories. Parameter "lazytime" causes only the timestamps atime, mtime, and ctime on the in-memory version of the file inode to be updated. The "norecovery" option prevents data recovery to be performed at mount time.

At step 510, the partition is mounted as a read-write volume. In instances in which the given guest operating system 216 is Linux, step 510 may be performed by using the "usr/bin/mount rw" command.

At step 512, the read-only list is updated to include a reference to the storage partition. Step 512 may be executed by using any of the methods discussed above with respect to FIG. 3.

Figure 6:
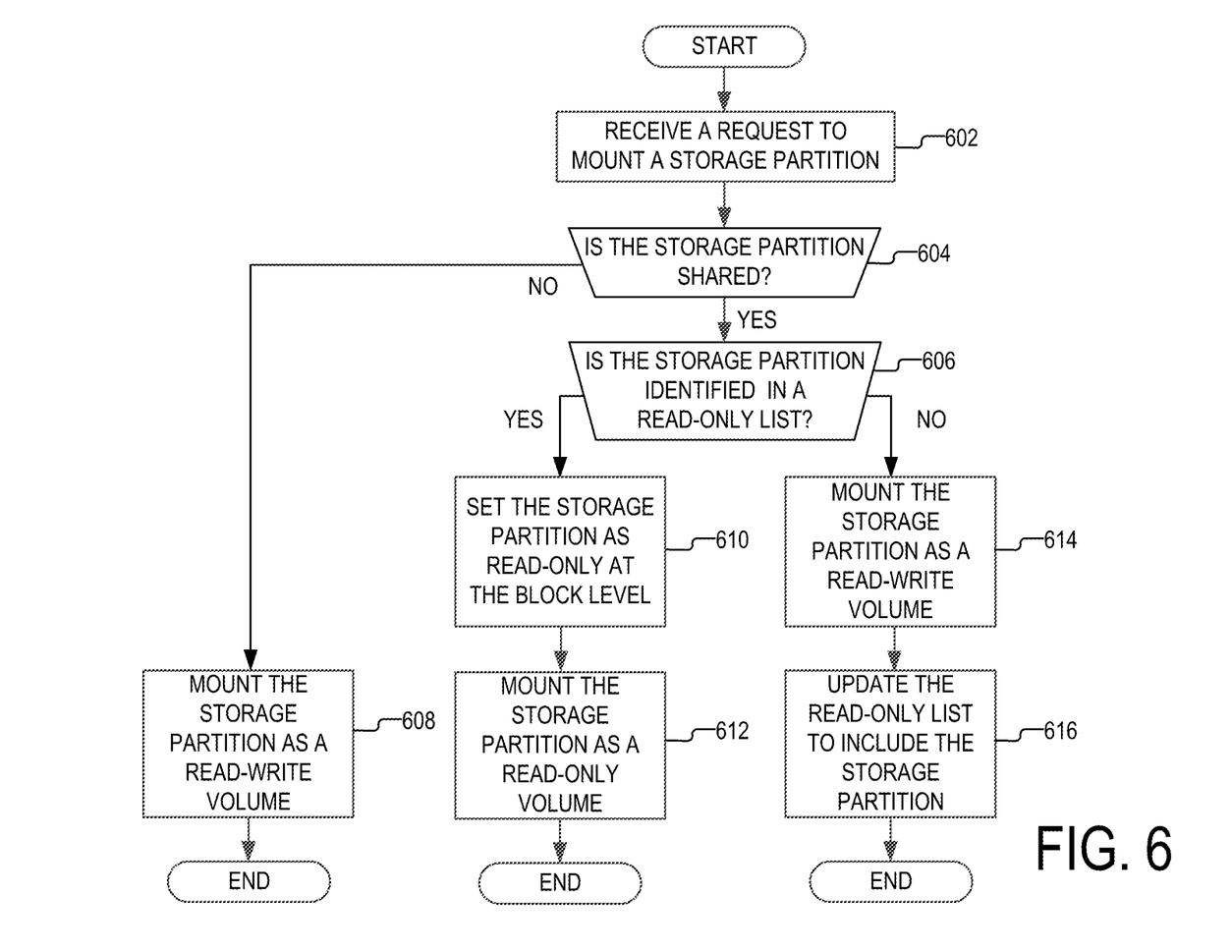
FIG. 6 is a flowchart of an example of a process, according to aspects of the disclosure.

FIG. 6 is a flowchart of an example of a process 600, according to aspects of the disclosure. According to the present example, all of the steps in the process 600 are performed by one of the instances of the agent 312 (shown in FIG. 3), which is herein referred to as "the given agent 312". The guest operating system 216 where the given agent 312 is executed is herein referred to as "given guest operating system 216".

At step 602, the given agent 312 receives a request to mount a storage partition. The storage partition may be one of the storage partitions 317, which are discussed above with respect to FIG. 3. In some implementations, the request may be received from the management system 117 (shown in FIG. 1). At step 604, the given agent 312 determines if the storage partition is intended to be shared by multiple guest operating systems 216. In some implementations, the given agent 312 may determine if the request (received at step 602) indicates that the storage partition is shared. For example, the given agent 312 may determine if the request includes an indication that the storage partition is shared. Alternatively, to determine whether the storage partition is shared, the given agent 312 may perform a search of the list 315 (shown in FIG. 3) to determine if the list 315 contains an identifier of the storage partition. In some implementations, the search of the list 315 may be performed by using any of the methods discussed above with respect to FIG. 3. At step 606, the given agent 312 determines if the storage partition is identified in the read-only list 314. Step 606 may be performed by using any of the methods discussed above with respect to FIG. 3. If the partition identifier is part of the read-only list 314, the process 600 proceeds to step 610. Otherwise, the process 600 proceeds to step 614.

At step 608, the given agent 312 mounts the storage partition as a read-write volume in the given guest operating system 216. In some implementations, step 608 may be performed in the same or similar manner as step 510 of the process 500 (shown in FIG. 5). At step 610, the given agent 312 sets the storage partition as read-only at the block level. In some implementations, step 610 may be performed in the same manner as step 506 of the process 500 (shown in FIG. 5). At step 612, the storage partition is mounted as a read-only volume. In some implementations, step 612 may be performed in the same manner as step 508 of the process 500 (shown in FIG. 5). At step 614, the partition is mounted as a read-write volume. In some implementations, step 614 may be performed in the same manner as step 510 of the process 500 (shown in FIG. 5). At step 616, the read-only list 314 is updated to include the storage partition. Step 616 may be performed by using any of the methods discussed above with respect to FIG. 3.

Figure 7:
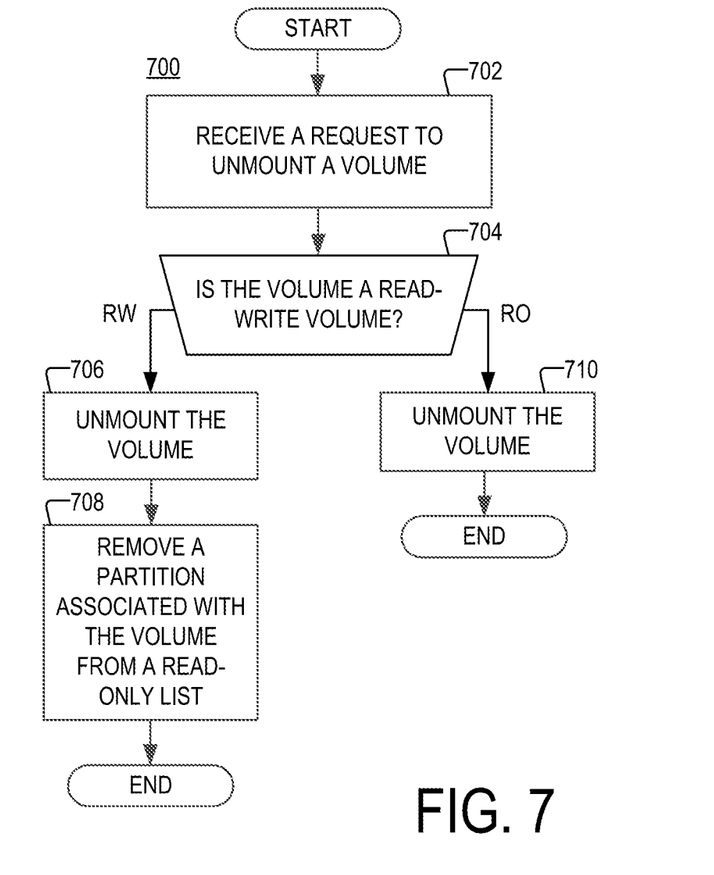
FIG. 7 is a flowchart of an example of a process, according to aspects of the disclosure.

FIG. 7 is a flowchart of an example of a process 700, according to aspects of the disclosure. According to the present example, all of the steps in the process 700 are performed by one of the instances of the agent 312 (shown in FIG. 3), which is herein referred to as "the given agent 312". The guest operating system 216 where the given agent 312 is executed is herein referred to as "given guest operating system 216".

At step 702, the given agent 312 receives a request to unmount a volume that is mounted in the given guest operating system 216. In some implementations, the request may be received from the management system 117 (shown in FIG. 1). At step 704, the given agent 312 determines if the volume is read-write or read-only. If the volume is mounted in read-write mode, the process 700 proceeds to step 706. Otherwise, if the volume is mounted in read-only mode, the process 700 proceeds to step 710. At step 706, the given agent 312 unmounts the volume. At step 708, the given agent 312 removes the storage partition used to implement the volume from the read-only list 314. The storage partition may be the same or similar to one of the storage partitions 317 that are discussed above with respect to FIG. 3. The removal may be performed by using one of the methods discussed above with respect to FIG. 3. In some implementations, after the storage partition is removed, the given agent 312 may transmit a notification to other agents 312 to inform them that the storage partition is no longer on the read-only list, and as such it is available to be mounted in read-write mode on another guest operating system 216 (e.g., a guest operating system 216 where at present the storage partition is mounted in read-only mode). At step 710, the given agent 312 unmounts the volume.

Figure 8:
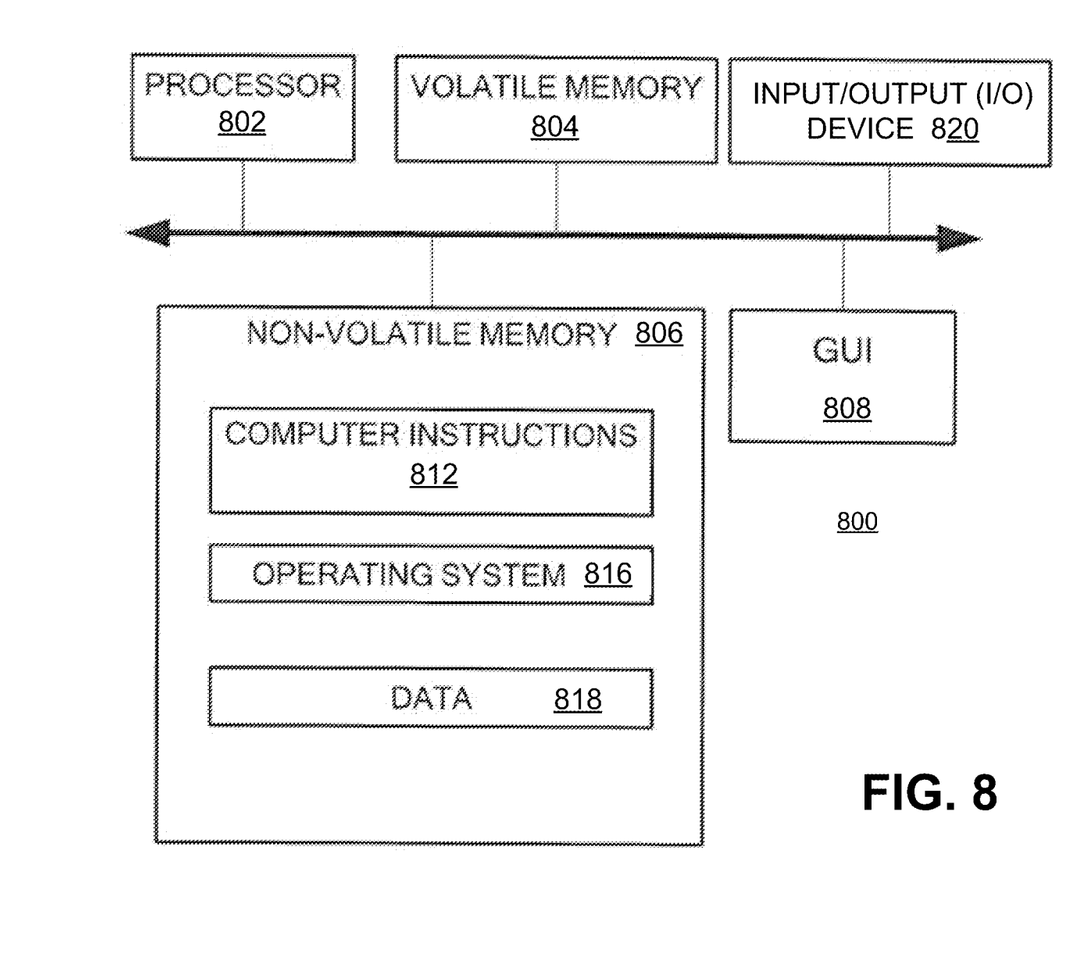
FIG. 8 is a diagram of an example of a computing device, according to aspects of the disclosure.

Referring to FIG. 8, in some embodiments, a computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from I/O device 820.

FIGS. 1-8 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-8 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The phrase "memory space of a guest operating system" may refer to volatile or non-volatile memory which the guest operating system (or applications running within the guest operating system) is allowed to access.

According to the example of FIGS. 4-7, the steps in each of processes 400-700 are performed by the same instance of the agent 312 (shown in FIG. 3. However, alternative implementations are possible in which different steps in any of the processes 400-700 are performed by the different instances of the agent 312 (which are executed in different guest operating systems 216). Furthermore, alternative implementations are possible in which the any of the processes 400-700 (or individual steps within the process) are performed by a process or entity other than one of the agents 312. Stated succinctly, the present disclosure is not limited to any specific entity executing the processes 400-700. The phrase "memory space of a guest operating system" as used throughout the disclosure may refer to any volatile and/or non-volatile memory space that is accessible by the guest operating system or an application that is executed in the guest operating system.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   receiving, by an agent that is executing in a first guest operating system, a request to mount a storage partition;
   detecting, by the agent, whether the storage partition is identified in a read-only list;
   when the storage partition is identified in the read-only list, setting the storage partition as read-only at a block level, and mounting the storage partition in the first guest operating system as a read-only volume; and
   when the storage partition is not identified in the read-only list, mounting the storage partition in the first guest operating system as a read-write volume and updating the read-only list to include an identifier of the storage partition.

2. The method of claim 1, wherein:
   the read-only list identifies a plurality of storage partitions,
   each storage partition in the plurality is shared among multiple guest operating systems that are executing on a same storage processor, and
   each storage partition in the plurality is already mounted in only one guest operating system as a read-write volume.

3. The method of claim 1, wherein the read-only list is a list that is accessible by multiple computing devices in a computing system and the storage partition is shared between at least two of the computing devices.

4. The method of claim 1, further comprising:
   detecting whether the storage partition is shared between multiple master containers; and
   when the storage partition is not shared between multiple master containers, mounting the storage partition as a read-write volume, and
   wherein the detecting of whether the storage partition is identified in a read-only list is performed only when the storage partition is shared.

5. The method of claim 1, wherein the storage partition is formatted using a disk file system.

6. The method of claim 1, wherein updating the read-only list to include an identifier of the storage partition includes:
   updating a first copy of the read-only list that is local to the first guest operating system; and
   transmitting from the first guest operating system to a second guest operating system an instruction for the second guest operating system to update a second a copy of the read-only list to include the identifier of the storage partition.

7. The method of claim 1, wherein the first guest operating system is executed in a master container that is provided by a host operating system.

8. A system comprising:
   a memory; and
   at least one processor that is operatively coupled to the memory, the at least one processor being configured to perform the operations of:
   receiving, by an agent that is executing in a first guest operating system, a request to mount a storage partition;
   detecting, by the agent, whether the storage partition is identified in a read-only list;
   when the storage partition is identified in the read-only list, setting the storage partition as read-only at a block level, and mounting the storage partition in the first guest operating system as a read-only volume; and
   when the storage partition is not identified in the read-only list, mounting the storage partition in the first guest operating system as a read-write volume and updating the read-only list to include an identifier of the storage partition.

9. The system of claim 8, wherein:
   the read-only list identifies a plurality of storage partitions,
   each storage partition in the plurality is shared among multiple guest operating systems that are executing on a same storage processor, and
   each storage partition in the plurality is already mounted in only one guest operating system as a read-write volume.

10. The system of claim 8, wherein the read-only list is a list that is accessible by multiple computing devices in a computing system and the storage partition is shared between at least two of the computing devices.

11. The system of claim 8, wherein:
    the at least one processor is further configured to perform the operations of detecting whether the storage partition is shared between multiple master containers, and when the storage partition is shared between multiple master containers, mounting the storage partition as a read-write volume; and
    the detecting of whether the storage partition is identified in a read-only list is performed only when the storage partition is shared.

12. The system of claim 8, wherein the storage partition is formatted using a disk file system.

13. The system of claim 8, wherein updating the read-only list to include an identifier of the storage partition includes:
    updating a first copy of the read-only list that is local to the first guest operating system; and
    transmitting from the first guest operating system to a second guest operating system an instruction for the second guest operating system to update a second a copy of the read-only list to include the identifier of the storage partition.

14. The system of claim 8, wherein the first guest operating system is executed in a master container that is provided by a host operating system.

15. A non-transitory computer-readable medium storing one or more processor-executable instructions, which, when executed by at least one processor cause the at least one processor to perform the operations of:
    receiving, by an agent that is executing in a first guest operating system, a request to mount a storage partition;
    detecting, by the agent, whether the storage partition is identified in a read-only list;
    when the storage partition is identified in the read-only list, setting the storage partition as read-only at a block level, and mounting the storage partition in the first guest operating system as a read-only volume; and
    when the storage partition is not identified in the read-only list, mounting the storage partition in the first guest operating system as a read-write volume and updating the read-only list to include an identifier of the storage partition.

16. The non-transitory computer-readable medium of claim 15, wherein:
    the read-only list identifies a plurality of storage partitions,
    each storage partition in the plurality is shared among multiple guest operating systems that are executing on a same storage processor, and
    each storage partition in the plurality is already mounted in only one guest operating system as a read-write volume.

17. The non-transitory computer-readable medium of claim 15, wherein the read-only list is a list that is accessible by multiple computing devices in a computing system and the storage partition is shared between at least two of the computing devices.

18. The non-transitory computer-readable medium of claim 15, wherein:
    the one or more processor-executable instructions, when executed by the at least one processor, further cause the at least one processor to perform the operations of: detecting whether the storage partition is shared between multiple master containers, and when the storage partition is shared between multiple master containers, mounting the storage partition as a read-write volume; and
    the detecting of whether the storage partition is identified in a read-only list is performed only when the storage partition is shared.

19. The non-transitory computer-readable medium of claim 15, wherein the storage partition is formatted using a disk file system.

20. The non-transitory computer-readable medium of claim 15, wherein updating the read-only list to include an identifier of the storage partition includes:

updating a first copy of the read-only list that is local to the first guest operating system; and transmitting from the first guest operating system to a second guest operating system an instruction for the second guest operating system to update a second a copy of the read-only list to include the identifier of the storage partition.

\* \* \* \* \*